United States Patent [19]

Graham, Jr.

[11] Patent Number: 5,049,113
[45] Date of Patent: Sep. 17, 1991

[54] VARIABLE CIRCUMFERENCE ADJUSTABLE-DRIVE PULLEY MECHANISM

[76] Inventor: James A. Graham, Jr., 3712 N. Broadway, Chicago, Ill. 60613

[21] Appl. No.: 597,318

[22] Filed: Oct. 15, 1990

[51] Int. Cl.⁵ .............................................. F16H 55/52
[52] U.S. Cl. ........................................ 474/49; 474/13
[58] Field of Search ................................... 474/11–13, 474/49, 50, 69, 70, 101, 113

[56] References Cited

U.S. PATENT DOCUMENTS

| | | | |
|---|---|---|---|
| 3,747,721 | 7/1973 | Hoff | 474/13 X |
| 4,179,946 | 12/1979 | Kanstoroom | 474/13 X |
| 4,925,433 | 5/1990 | Brown | 474/49 X |

Primary Examiner—Thuy M. Bui
Attorney, Agent, or Firm—Jerome J. Norris

[57] ABSTRACT

A compact, reliable lightweight variable diameter drive mechanism for use with either a belt or a chain comprising outwardly biased, frusto-conical axially movable pulley halves and an automatically adjustable, flexible contacting surface wrapped around the pulley axle. The contacting surface is capable of imparting significant amounts of traction to the belt or the chain riding on the pulley halves. The contacting surface automatically varies its circumference as the pulley diameter changes. Tension on the flexible contacting surface is maintained by retracting one end into the hub of the pulley as the pulley halves are axially adjusted.

8 Claims, 4 Drawing Sheets

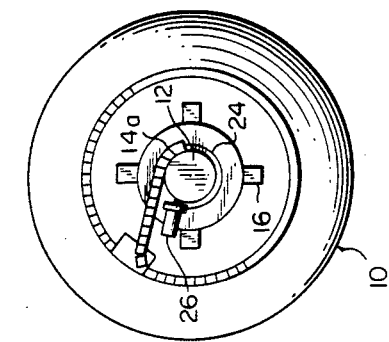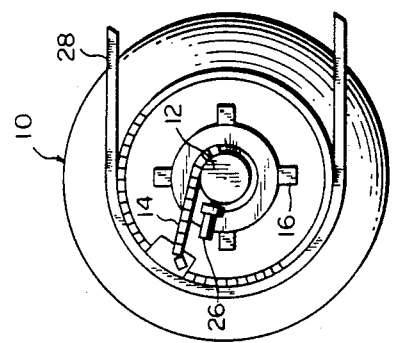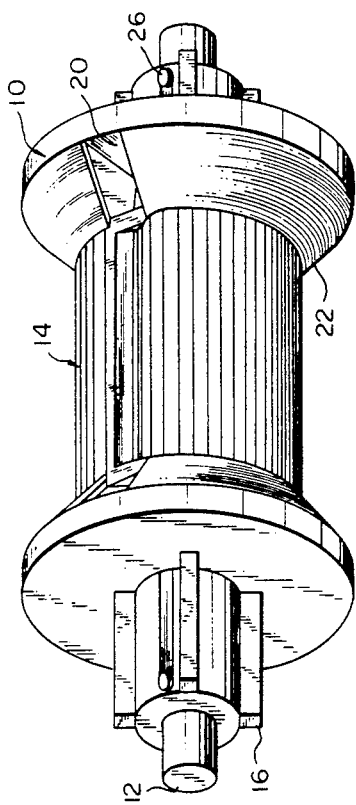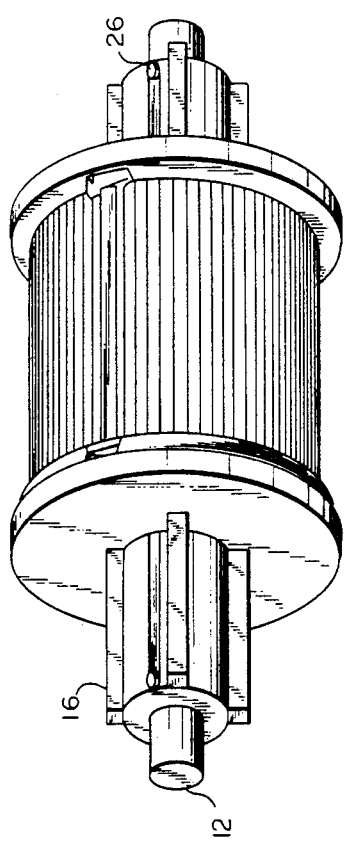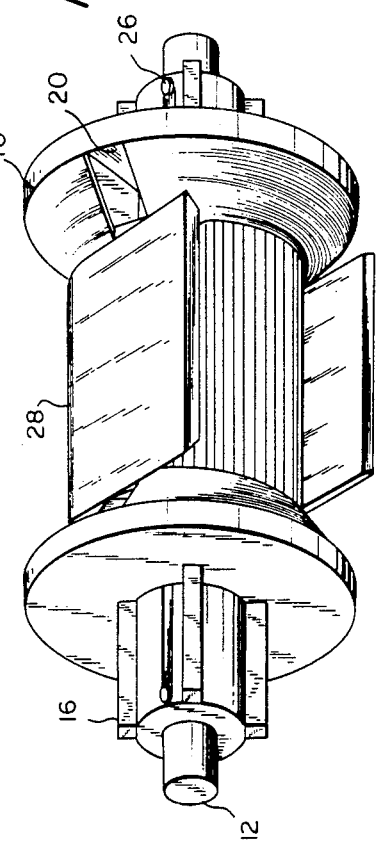

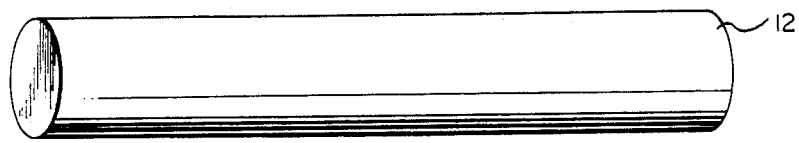
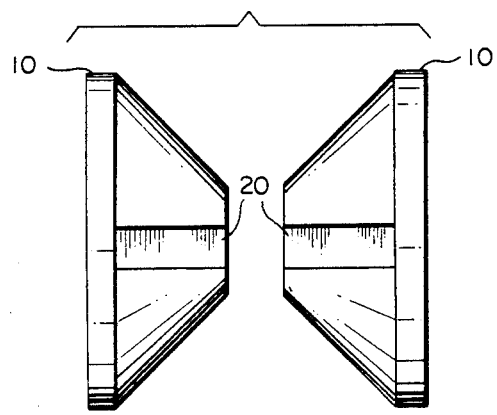
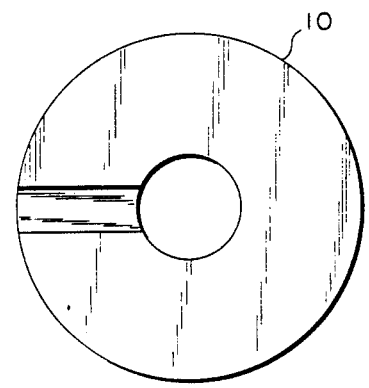
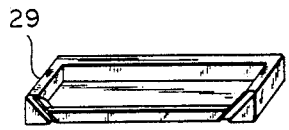
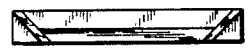
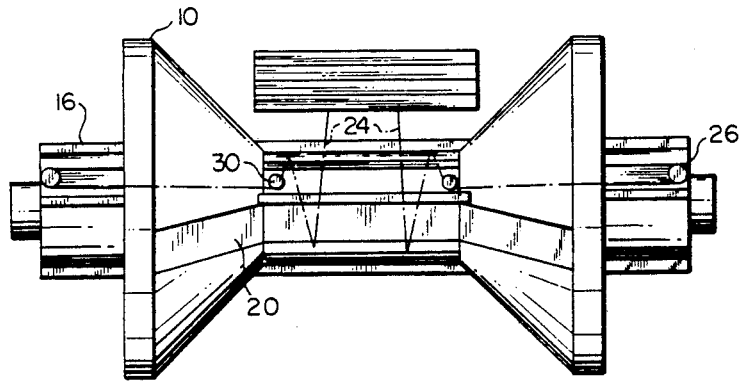
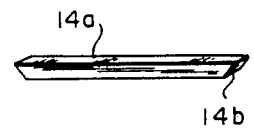
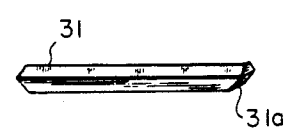

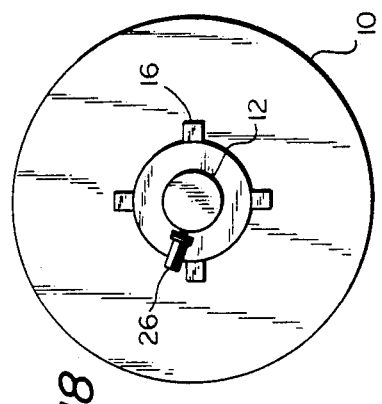
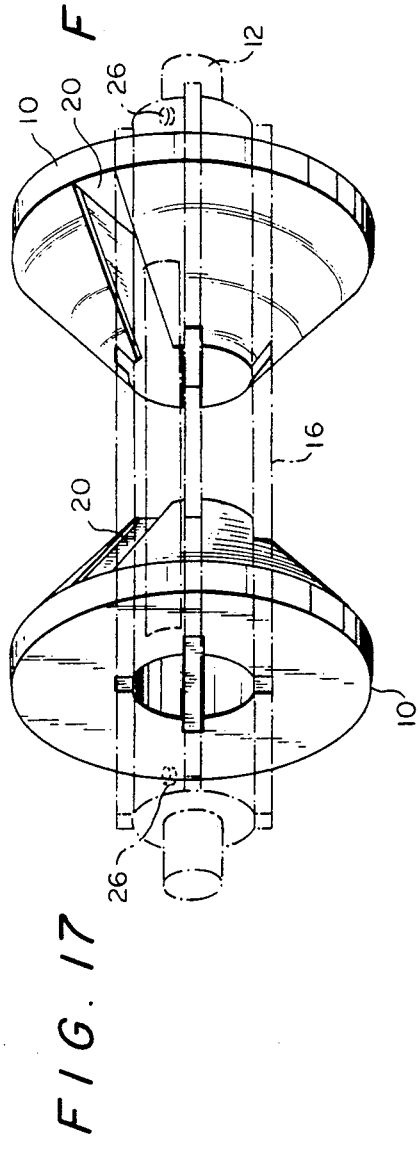
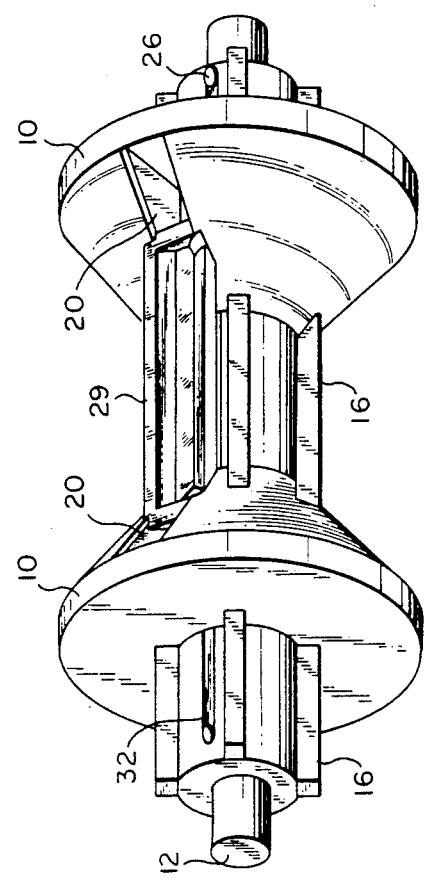
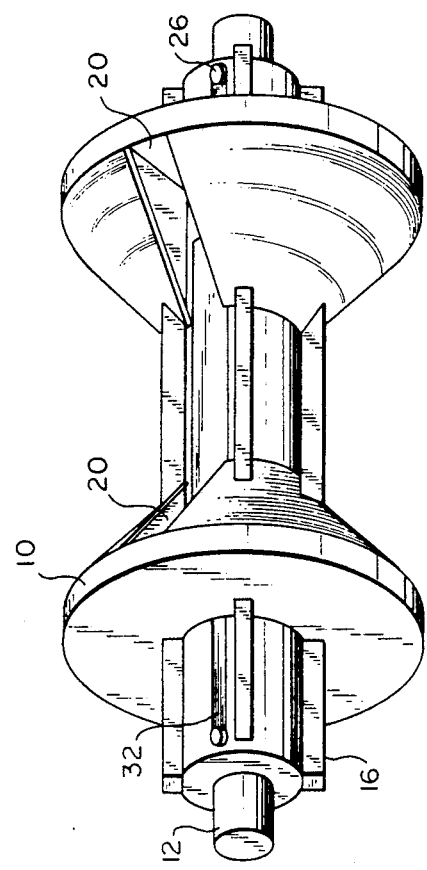

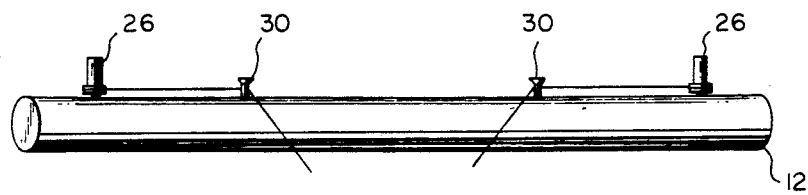
FIG. 21  FIG. 22
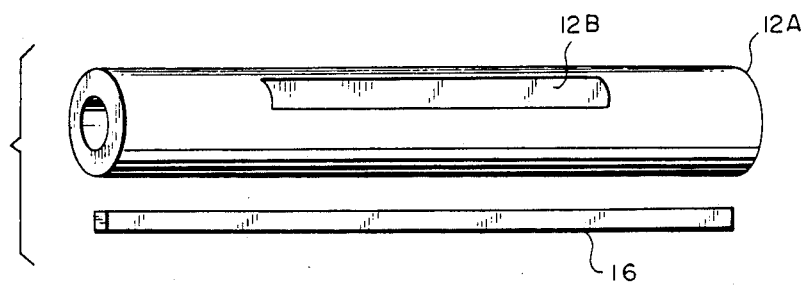
FIG. 23
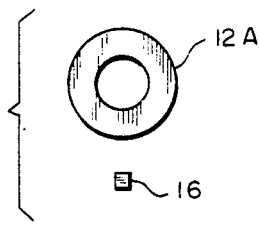
FIG. 24
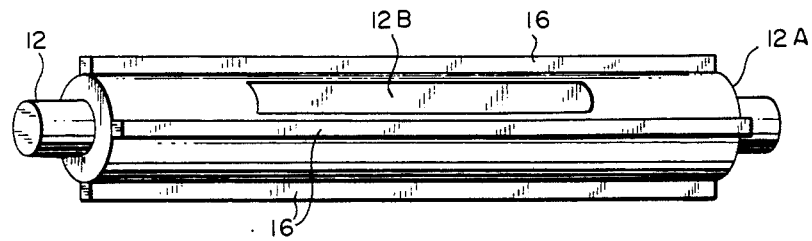
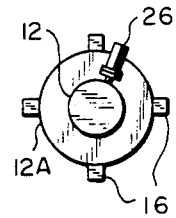
FIG. 25  FIG. 26
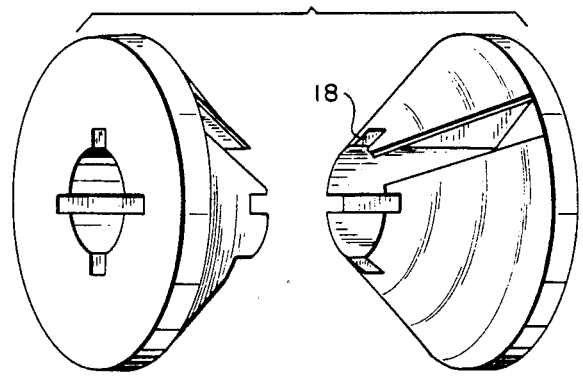
FIG. 27

VARIABLE CIRCUMFERENCE ADJUSTABLE-DRIVE PULLEY MECHANISM

BACKGROUND OF THE INVENTION

1. Field of the Invention

The invention pertains to an adjustable-speed drive mechanism for imparting and receiving rotational force, wherein said mechanism comprises a variable diameter pulley assembly and a flexible belt or chain wrapped around the axle of the pulley, that serves as a gripping surface.

2. The Prior Art

Variable diameter pulley systems have long been used in the mechanical transmission art, and are well known as inexpensive, but highly efficient means to derive infinitely variable output speeds from a constant power source, or means to cause an increase or a decrease in torque from a variable power source.

For example, in U.S. Pat. No. 4,179,946 there is disclosed a variable diameter, centrifugally responsive, tension operated pulley, which when used in combination with a substantially similar pulley and belt, provides a controlled-speed variable ratio accessory drive.

An automatic transmission for small motorized vehicles is disclosed in U.S. Pat. No. 3,747,721, and incorporates variable diameter pulleys, whereby drive ratios can easily be changed between upper and lower limits.

The June 1989 issue of *Machine Design* magazine presents an overview of variable speed transmissions in an article entitled "Mechanical Adjustable-Speed Drives." This magazine indicates that the efficiency of a variable diameter pulley system is usually about 95%, and that such systems provide good overload and jam protection due to favorable slips (i.e., the belts provide good overload and jam protection because the belt slips when overloaded).

However, despite the aforementioned advantages, variable diameter pulleys are known to be critically limited in relation to other types of mechanical transmissions insofar as the amount of useful power which can be handled due to the natural torque limitations of the belt and pulley combination itself.

Accordingly, a need exist in the mechanical transmission art, for a reliable method of increasing the torque handling capability of a variable diameter pulley.

With all current belt and pulley systems, contact between the belt and the pulley occurs on the side of the belt. Because of the small thickness of the belt necessary for belt flexibility, the contact area is small. In addition, the power transfer occurs by friction because the variable diameter prevents installing gear teeth or other positive engaging mechanisms on the side of the pulley. In this connection, it should be noted that some variable pulleys have ribs on the contact surfaces; however, the ribs and/or their spacing increases with increasing distance from the axis of the pulley half. Such systems can provide for a non-slip engagement, but only for very limited power, since the changing spacing on the pulley halves is incompatible with the fixed spacing on the belt.

SUMMARY OF THE INVENTION

One object of the present invention is to provide a reliable variable diameter pulley assembly having improved belt or engaging means wrapped around the pulley axle.

A further object of the present invention is to provide a variable diameter pulley assembly that incorporates a hollow axle capable of receiving and storing a flexible surface therein.

A yet further object of the present invention is to provide a variable diameter pulley assembly having a flexible belt or chain that can be circumferentially adjusted to agree with the changes in the pulley diameter.

A yet further object of the present invention is to provide a guide mechanism for the slots on the pulley halves which would serve as a positive attachment for one end of the engaging surface, and which serves as a locating device to fix the position of the other end of the engaging surface as it enters the storage area while preventing twisting of the surface.

In general, the invention is attained by providing a variable diameter pulley that is supported by a hollow spindle that is used in conjunction with a flexible surface in a manner such that the surface effectively increases the tractional forces of the pulley. The pulley can serve as either a driving member or as a driven member. The surface encircles the axle of the pulley and is held tightly thereto by a novel storage compartment in the hub of the pulley, thereby eliminating any slackness in the surface as the pulley halves move outwardly from one another.

In this assemblage, one end of the surface is permanently attached to an outer edge of the axle, while the other end of the surface is fastened to a tensioning means inside the axle. One possible tensioning means comprises cables connected to each of the pulley halves cooperatively. As the pulley halves move toward one another axially, the surface is automatically urged out of the storage compartment located in the hub, to allow the surface to smoothly ride-up the sides of each pulley half to achieve an outer diameter that is gauged to suit the increased working diameter of the pulley. Conversely, as the pulley halves move outwardly, the surface is recalled and stored in the hub, thereby assuming an effective circumference commensurate with the now decreased working diameter of the pulley.

With this arrangement, contact between the pulley and the transfer mechanism (belt, chain, gear, or equivalent) occurs primarily at the engaging surface, and can occur secondarily on the sides of the pulley above the engaging surface if a belt is used. The engaging surface inherently provides a larger contact area than the belt sides for a normal variable pulley, and can be widened as necessary to transmit any amount of power. The engaging surface can have "V" grooves running along its length for use with multi-ribbed belts or multiple belts for additional power. Conversely, the engaging surface can be equipped with gear teeth for positive engagement instead of friction engagement. Gears or toothed belts can be used for high power non-slip power transfer.

BRIEF DESCRIPTION OF THE DRAWINGS

FIG. 1 is a prospective view of the variable circumference adjustable-drive pulley mechanism when the engaging surface is at a medium height, as situated on the hollow axle member, with the flexible flat belt removed.

FIG. 2 is a cross-sectional side view of FIG. 1.

FIG. 3 is a perspective view of the variable circumference adjustable-drive pulley mechanism when the engaging surface is at maximum height.

FIG. 4 is a perspective view of the variable circumference adjustable-drive pulley mechanism showing a flat belt riding on the engaging surface.

FIG. 5 is a cross-sectional side view of FIG. 4.

FIG. 6 is a view of the axle of the pulley mechanism.

FIG. 7 is a side view showing one embodiment of the slotted frusto-conical pulley halves of the invention.

FIG. 8 is an end view of one of the pulley halves depicted in FIG. 7.

FIG. 9 is a perspective view of the guide device that rides in the slots of the frusto-conical pulley halves.

FIG. 10 is a front view of the guide device of FIG. 9.

FIG. 11 is a top view of the guide device of FIG. 9.

FIG. 12 is a perspective view showing the tensioning mechanism of the variable circumference adjustable-drive pulley mechanism with the engagement surface raised, and wherein the pulley strings are shown by dark lines and the engaging surface tensioning strings are shown, by dotted lines.

FIG. 13 is a perspective view of an engaging surface segment.

FIG. 14 is a perspective view of a gear type engaging surface segment.

FIG. 15 is a side view of FIG. 14.

FIG. 16 is a perspective view of a section-of-gear type of engaging surface.

FIG. 17 is a "see through" view of the axle and pulley halves assembled in accordance with the invention.

FIG. 18 is a side view of FIG. 17.

FIG. 19 is a view in perspective of the axle and pulley halves assembled in accordance with the invention.

FIG. 20 is a view of the axle and pulley halves assembled in accordance with the invention, and showing the guide member device in the slots of the frusto-conical pulley halves.

FIG. 21 is a view of the inner axle showing the attachments of the concentric shafts and pins on which pulley strings are fixed.

FIG. 22 is a side view of FIG. 21.

FIG. 23 is an exploded view showing the outer axle-rail assemblage of the invention.

FIG. 24 is a side view of FIG. 23.

FIG. 25 is an axle view of the assemblage of the inner axle, outer slotted axle and rails disposed 45° degrees apart on the circumference of the outer axle, and wherein the concentric shafts and pins are omitted.

FIG. 26 is a side view of FIG. 25.

FIG. 27 depicts views of left and right frusto-conical pulley halves.

DETAILED DESCRIPTION OF THE INVENTION

The present invention can best be understood by reference to the drawings, wherein FIG. 1 cooperatively combines two variable frusto-conical pulley halves 10, an inner axle 12 and a flexible connectedly segmented engaging surface 14, for use in a centrifugally operated variable ratio drive system, and the variable pulley halves are rotatably supported or mounted on the hollow shaft or axle, in a manner such that these halves are biased outward axially by an internal spring or other equivalent biasing means.

In the preferred embodiment, the axle 12 is provided with one or more spline or rail means 16, that longitudinally extends along the axle and mates with corresponding openings 18 in an inside edge surface of the frusto-conical pulley halves. The splines, ribs or rails 16, serve to smoothly guide the pulley halves along the length of the axle as the pulley halves move in and out in speed responsive variable ratio transmission relationship to high and low speed centrifugally operated drive systems.

FIG. 1 shows the variable circumference pulley drive mechanism with the engaging surface at medium height.

Each pulley half is provided with one or more slots 20 located on its inner contacting surface 22. Through the slots 20 pass the engaging surface 14, which can also be either a belt, or a link chain, or a continuous web, or any such article.

As is shown in FIG. 23, an outer axle 12A incorporates a longitudinal opening 12B, located on one side of the axle, and said opening 12B serves to store and retain the unextended length 14A of the engaging surface, which is attached by engaging surface tensioning strings 24 to concentric shafts 26, which are fixed to the inner axle. The longitudinal opening 7 is bracketed by a guide member 29 that serves to guide the engaging surface in a smooth manner into and out of the outer axle. The outer axle 12A can be constructed of any lightweight, durable and inexpensive material. It is within the context of this invention that both the inner and outer axles should be tolerant to rust and other adverse environmental effects.

The engaging surface 14 is depicted in FIG. 3 is at maximum height and said surface is essentially a flexible, segmented belt. However, the engaging surface can be a continuous web, a link chain or any article capable of providing a surface upon which a cooperative drive belt, such as flat belt 28 or a chain or the like (not shown) can become tractively engaged, as per FIG. 4, where the flat belt is riding on the engaging surface. It is within the scope of the invention that the engaging surface also include teeth, clogs, cleats or other protuberances disposed around its circumference so as to enable it to mesh with a similar arrangement of teeth, clogs, cleats or other protuberances carried by a cooperating drive belt, chain or the like (not shown).

A clogged "V"-belt (not shown) used in conjunction with a clogged engaging surface would be expected to provide the greatest transmittal of rotational force, due to the combined advantage of frictional engagement of the "V"-belt with the inner contacting surface walls 22 of the pulley halves and the intermeshing clogs.

In general, the tensioning mechanism of the variable diameter pulley drive device of the invention consists of a combination of pulley strings and engaging surface tensioning strings, as shown in FIG. 12, where pulley strings or cables (shown in dark solid lines) are attached to the concentric shafts 26 of inner axle 12, and fixed to the inner opposite frusto-conical pulley half wall, and the engaging surface tensioning strings or cables (as shown by the dotted lines) are attached to the engaging surface 14 through hooks (not shown) or other suitable means and to pins 30. The engaging surface tensioning strings may also extend from pins 30 in attachment to the pulley strings, as shown.

The variable diameter pulley drive with one or more slots allows the gear teeth to be on a belt that rides on the pulley. Extra teeth are stored in the hollow axle and/or in the slot(s). Then the variable pulley is contracted, the belt rides higher on the pulley, and some teeth come out of the slot, thereby adding teeth. When the variable pulley is expanded, the belt rides lower on the pulley, and some teeth are pulled into the slot. In this way, the number of gear teeth are changed, without changing the number of teeth per unit distance.

As can be seen from FIG. 13, a segment 14a of engaging surface 14 is made so that its ends 14b are at an obtuse angle for purposes of permitting said segment ends to lie directly against the inclined or beveled inner contacting surface walls 22 of the pulley halves as the engaging surface rides low or high on the variable circumference mechanism. Alternatively, the segment of the engagement surface may be in the form of a gear type with tooth 31 and yet have ends disposed at obtuse angles 31a. A yet further configuration of the engaging surface is the section of a plularity of gears type 32, having ends with obtuse angles.

The axle 16 of the pulley mechanism, as shown in FIG. 6 can be modified as shown in FIG. 21 to provide a combination of concentric shafts 26 and pins 30 to hold or secure the pulley strings and engaging surface tensioning strings that comprise the tensioning mechanism, as shown in FIG. 12, after outer axle 12A, as shown in FIG. 23 is fitted over the inner axle shown in FIG. 21, and ribs or rails 16 are integrally disposed on the circumference of the outer axle in a placed apart 90° relationship, as shown in FIG. 26.

FIG. 17 is a break-away or see through view of the assembled axle and pulley halves without the tension strings, but showing the concentric shafts 26 that hold said pulley strings.

FIG. 19 is a perspective view of the assembled axle and pulley halves 26 showing the concentric shafts with pulley strings 32 attached, and FIG. 20 is a perspective view of the assembled axle and pulley halves, as in FIG. 19 except that guide member 29 is bracketed into longitudinal opening 7.

The pulley stings serve to retract the engaging surface into the interior of the axle, and it is within the contemplation of the invention that the pulley strings be biased, and cooperatively connected with the internal biasing means of the engaging surface tensioning strings.

While the present invention has been set forth with respect to the particular embodiments herein, it can be readily seen by those having ordinary skill in the art that numerous modifications are possible. Therefore, such modifications would easily fall within the scope of the invention claimed.

What is claimed is:

1. A variable diameter pulley drive mechanism, comprising:

a splined, rotably supported, hollow, axle member having one or more longitudinally extending openings;

a variable diameter traction element carried by said axle member, wherein said traction element includes a pair of outwardly biased frusto-conical pulley members capable of relative axial movement along said axle member;

one or more flexible engaging elements for positively contacting power transfer means riding upon said traction assembly;

and, tensioning means operatively connected to said engaging element, whereby stress exerted upon said tensioning means causes said engaging element to retract into said axle member through said longitudinal opening, so that said flexible engaging element is tightly carried by said traction element through every degree of variation;

said frusto-conical pulley halves having one or more slots to allow storage of unused portions of the engaging elements.

2. The variable diameter pulley mechanisms of claim 1, wherein said flexible engaging element is a toothed belt, a link chain or a continuous web.

3. The variable diameter pulley mechanism of claim 1, wherein said hollow axle member provides storage for retracted portions of said engaging element.

4. The variable diameter pulley mechanism of claim 1, wherein said tensioning means comprises first and second cables connected respectively, to each pulley member, whereby tension exerted upon said cables varies the diameter of said traction assembly thereby tightening said engaging element automatically.

5. The variable diameter pulley drive mechanism of claim 1, further comprising a guide device which rides in the slots of the frusto-conical pulley halves to provide: (a) an attachment location for one side of the engaging element; and (b) a snug-fitting hole for passage of the engaging element to the storage area while properly locating the other side of the engaging element to prevent shifting and twisting.

6. The variable diameter pulley drive mechanism of claim 1, wherein said power transfer means is a V-shaped belt.

7. The variable diameter pulley drive mechanism of claim 1, wherein said power transfer means is a chain.

8. The variable diameter pulley drive mechanism of claim 1, wherein said power transfer means is a gear.

* * * * *